Figure 1:
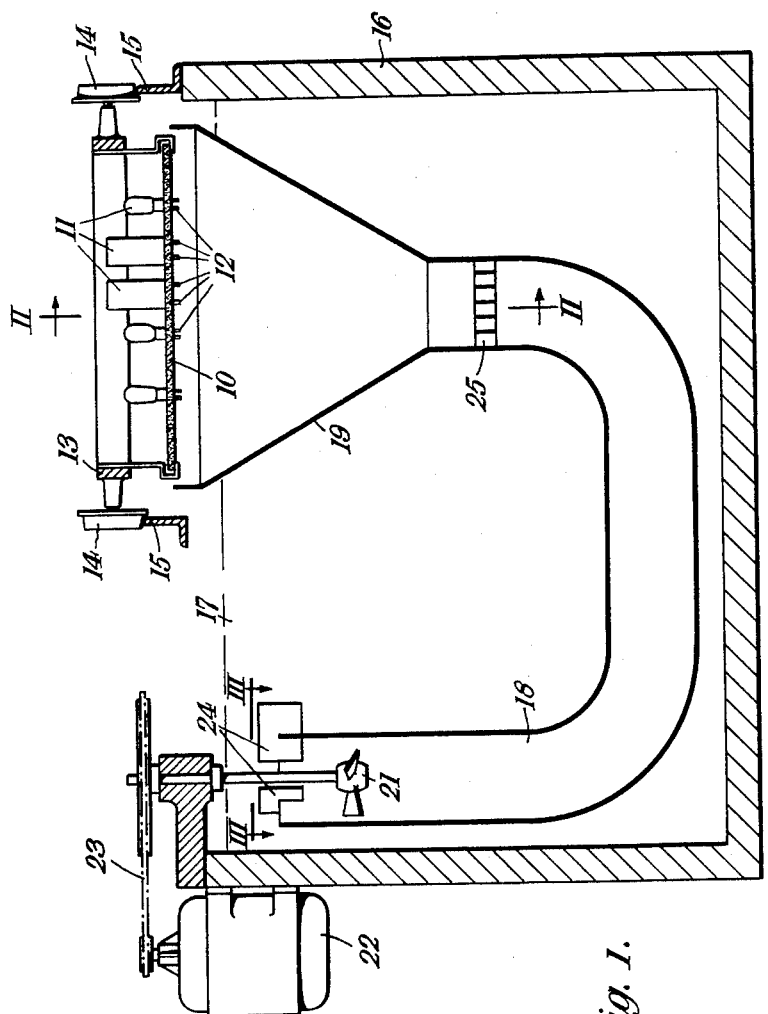

INVENTORS
ALLAN F.C. BARNES
VICTOR B. ELLIOTT
RUDOLF S. STRAUSS

Oct. 2, 1962  A. F. C. BARNES ETAL  3,056,370
APPARATUS FOR SOLDERING
Filed Oct. 9, 1956  2 Sheets-Sheet 2

INVENTORS
ALLAN F.C. BARNES
VICTOR B. ELLIOTT
RUDOLF S. STRAUSS

By
Watson, Cole, Grindle & Watson
ATTORNEYS

7
United States Patent Office 3,056,370
Patented Oct. 2, 1962

3,056,370
APPARATUS FOR SOLDERING
Allan Francis Charles Barnes, London, Victor Bernard Elliott, Wallington, and Rudolf Siegfried Strauss, London, England, assignors to Fry's Metal Foundries Limited, London, England
Filed Oct. 9, 1956, Ser. No. 614,873
Claims priority, application Great Britain Oct. 14, 1955
3 Claims. (Cl. 113—126)

Components, such as resistors, capacitors, valve sockets and the like are normally assembled on the rear surface of the insulating panel of a printed circuit by inserting pins on the components through suitably placed holes in the circuit panel. It is then necessary to solder the pins to the metal of the printed pattern to secure effective electrical connection of the components to the printed circuit.

The existing practice is to coat the front surface of the panel, i.e. the surface on which the circuit is printed, with a soldering flux, preferably a rosin based flux, and then to dip the flux coated front surface of the panel into a bath of molten solder. This procedure, however, has the disadvantage that the flux may accumulate around the joints to an extent sufficient to deny access to the solder, with the result that an inadequate electrical connection is produced. Another disadvantage is that the surface of the bath is covered with a film of oxide which may prejudice effective soldering. This oxide film has to be removed each time before a panel is dipped which complicates the dipping procedure and in addition, a certain amount of solder is wasted.

The invention provides a method of soldering components to the panel of a printed circuit which consists in effecting relative movement between the panel and a stream of molten solder directed against the flux-coated surface of the panel. The solder will, in this case, be effective to wash out any flux which may have penetrated into the holes in the panel and so ensure effective electrical connection of the pins to the circuit. This method of soldering in effect provides an angled contact between the entire surface to be soldered and the surface of the solder. This permits the flux to be displaced readily by the molten solder, giving the latter complete and unhindered access to the joints to be soldered. In addition, since the panel is in contact with a moving stream of solder, the chilling effect of the panel is negligible, the rate of heat transfer is greatly improved and consequently any part of the panel need be in contact with the molten solder for less time than in the case of flat dipping to produce a satisfactory electrical joint. Another advantage is that since the stream of solder is derived from below the free surface of the bath it is free from oxides or other contaminants.

Preferably the stream of solder is directed vertically upwards against the flux coated front surface of the panel, although it may be directed at any other convenient angle to the surface. Most conveniently, the solder is ejected upwardly against the panel through a rectangular nozzle of a length exceeding the width of the panel, and the panel is moved relatively to the jet until its entire surface has received an application of solder.

The invention includes apparatus for soldering components to the panel of a printed circuit comprising a tank to contain molten solder, a nozzle having a narrow, elongated rectangular mouth disposed horizontally and above the normal level of solder in the tank, a pipe in the tank communicating at one end with the lower end of the nozzle and open at the other end to the solder in the tank, a pump in the pipe which is operative to discharge solder upwardly from the mouth of the nozzle in a wave having a level crest, and horizontal rails adjacent the narrow ends of the mouth of the nozzle for supporting the panel and permitting it to be traversed over the nozzle with its undersurface in contact with the crest of the wave of solder.

Figure 2:
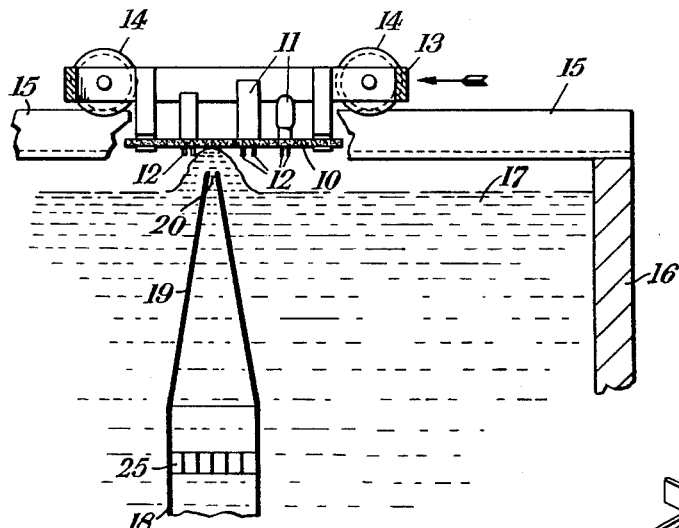
Figure 3:
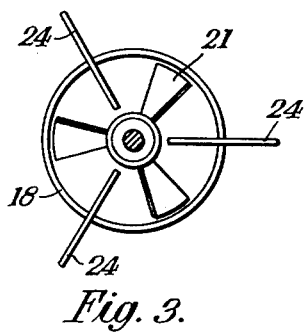
Figure 4:
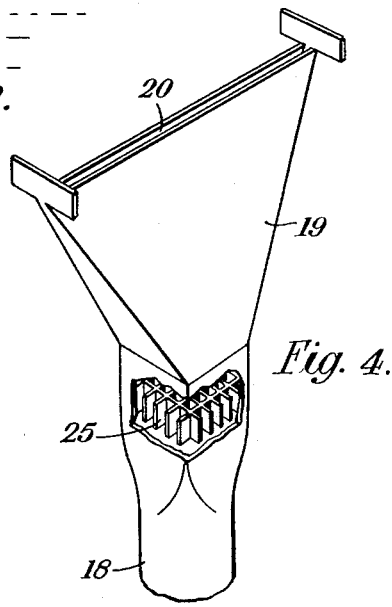

One specific apparatus for carrying the invention into effect will now be described in detail, by way of example, with reference to the accompanying diagrammatic drawing, in which:

FIG. 1 is a vertical section through the apparatus,
FIG. 2 is a section on the line II—II in FIG. 1,
FIG. 3 is a section on a larger scale on the line III—III in FIG. 1, and
FIG. 4 is a perspective view of the nozzle partly in section.

The printed circuit to be soldered is made in any conventional way, e.g. by applying a coating of copper to a panel of insulating material, applying a pattern of acid-resistant ink to the metal coating, etching away the metal unprotected by the ink and removing the ink. Holes are then made in the panel at the points where components are to be connected to it. The components are then assembled on the back of the panel by pushing their contact pins through the holes and flux is applied, e.g. by spraying, to the front surface of the panel.

In the drawing, the panel is indicated at 10, certain of the components on the panel at 11 and the downwardly projecting pins at 12. The panel 10 is supported with its flux coated side downwards by a carriage 13, having wheels 14 by which it can be traversed along horizontal rails 15.

The rails 15 are located above a tank 16 containing molten solder 17 heated either by an immersion heater or by an external gas heater. Supported in the tank by suitable brackets, not shown, is a pipe 18, open at one end to the solder in the tank and connected at the other end to a nozzle 19. The nozzle has a narrow, elongated rectangular mouth 20 extending horizontally above the level of the solder in the tank and with its longer dimension extending transversely to the rails 15.

In the pipe 18 is a pump constituted by a bladed impeller 21, driven by a variable speed electric motor 22 through a belt drive 23. The pump delivers solder, derived from a point below the top level of the solder in the tank, upwardly through the mouth 20 of the nozzle as a wave, the expelled solder being directed against the undersurface of the panel 10 and cascading back into the tank.

It is important that the crest of the wave of solder should be level throughout its length. The nozzle 19 is accordingly designed so that there is no increase in its cross-sectional area from its lower end to its mouth. Consequently no eddies can form in the solder in the nozzle. In the case illustrated the cross-sectional area of the pipe 18 is 9 sq. ins. and the cross-section of the nozzle decreases progressively from its lower end to 4 sq. ins. at its mouth 20, the mouth being 8 inches long and ½ inch wide. To avoid vortex formation by the pump 21, vanes 24 are provided at the inlet to the pipe 18. The nozzle 19 is shaped so that the speed of flow of the solder through it is even throughout its cross section, and the pipe 18 contains a flow straightener 25 of honeycomb form which ensures laminar flow of the solder.

Control of the height of the wave 23 of solder expelled from the mouth of the nozzle is effected by variation of the speed of the motor 22. The wave of solder must make contact with the undersurface of the panel 10 but must not splash over into contact with the upper surface of the panel. Where the pins 12 project downwardly, as shown from the panel 10 the wave 23 of solder may need to have a height of up to ½ inch. If, however, the pins are turned to lie flat against the undersurface of the panel, the panel may be supported at a lower level and the height of the wave can be considerably reduced.

By suitably dimensioning the pipe 18 and the nozzle 19 and by providing the vortex-preventing vanes 24 and the flow straightener 25, an overflow from the nozzle is obtained which is both level and free from turbulence. The level of the rails 15 is such that the flux-coated surface of the panel 10 is brought into contact with the wave of solder issuing upwards from the nozzle, the pins 12 being clear of the end of the nozzle. The carriage 13 may be pushed along the rails 15 in succession by mechanical means.

The solder effectively joins the pins to the circuit, and remains as a surface coating on the metal portions of the printed circuit. Since it does not wet the insulating backing, the portions of the panel between the printed conductors receive no coating of solder. A non-corrosive electrically insulating flux residue may remain on these portions of the panel.

What we claim as our invention and desire to secure by Letters Patent is:

1. Apparatus for soldering components to panels of a printed circuit comprising a tank to contain molten solder, a nozzle having a narrow, elongated, rectilinear, upwardly opening horizontal mouth disposed above the normal level of the solder in said tank, a pipe in said tank extending upwardly at one end into communication with said nozzle and open at the other end to the solder in said tank, said nozzle decreasing progressively in cross-sectional area from said pipe to said nozzle mouth, a plurality of radially arranged vanes positioned at the entry end of the pipe and before the pump, a honeycomb positioned in the pipe between the pump and the nozzle, and a rotary pump in the pipe for discharging the molten solder upwardly through the mouth of said nozzle in a continuous, smooth, non-turbulent wave overflowing the mouth of the nozzle, while remaining in contact with the nozzle, and having a level rectilinear crest appreciably above said nozzle mouth.

2. Apparatus as defined in claim 1, including means associated with said tank and nozzle for traversing said panels in a continuous rectilinear motion across said overflowing wave of solder and at a predetermined constant level relation to said wave transversely to its said rectilinear crest, with the undersurface of each panel contacting the said crest but spaced from the mouth of said nozzle.

3. Apparatus for soldering components to panels of a printed circuit comprising a tank to contain molten solder, a nozzle having a narrow, elongated, rectilinear, upwardly opening horizontal mouth disposed above the normal level of the solder in said tank, a pipe in said tank extending upwardly at one end into communication with said nozzle and open at the other end to the solder in said tank, said nozzle decreasing progressively in cross sectional area from said pipe to said nozzle mouth, a honeycomb positioned in the pipe between the pump and the nozzle, and a rotary pump in the pipe for discharging the molten solder upwardly through the mouth of said nozzle in a continuous, smooth, non-turbulent wave overflowing the mouth of the nozzle, while remaining in contact with the nozzle, and having a level rectilinear crest appreciably above said nozzle mouth.

References Cited in the file of this patent

UNITED STATES PATENTS

| | | |
|---|---|---|
| 157,256 | Wiard | Nov. 24, 1874 |
| 469,211 | Kline | Feb. 16, 1892 |
| 485,906 | Brown | Nov. 8, 1892 |
| 1,200,272 | Taylor | Oct. 3, 1916 |
| 2,101,854 | Haunz | Dec. 14, 1937 |
| 2,469,392 | Jones | May 10, 1949 |
| 2,474,691 | Roehm | June 28, 1949 |
| 2,515,097 | Schryber | July 11, 1950 |
| 2,683,099 | Hahn | July 6, 1954 |
| 2,756,485 | Abramson et al. | July 31, 1956 |
| 2,771,048 | Zimmerman | Nov. 20, 1956 |
| 2,771,049 | Fish | Nov. 20, 1956 |
| 2,777,192 | Albright et al. | Jan. 15, 1957 |
| 2,869,497 | Lehner | Jan. 20, 1959 |
| 2,870,532 | Young | Jan. 27, 1959 |

FOREIGN PATENTS

| | | |
|---|---|---|
| 712,109 | Great Britain | July 21, 1954 |